(12) United States Patent
Broussard et al.

(10) Patent No.: US 9,673,629 B2
(45) Date of Patent: Jun. 6, 2017

(54) HIGH VOLTAGE DIRECT CURRENT TRANSMISSION AND DISTRIBUTION SYSTEM

(71) Applicant: EATON CORPORATION, Cleveland, OH (US)

(72) Inventors: Harry Broussard, Arden, NC (US); Geraldo Nojima, Matthews, NC (US)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 14/997,797

(22) Filed: Jan. 18, 2016

(65) Prior Publication Data

US 2016/0134118 A1    May 12, 2016

Related U.S. Application Data

(62) Division of application No. 13/901,770, filed on May 24, 2013, now Pat. No. 9,270,119.

(51) Int. Cl.
*H02J 3/36* (2006.01)
*H02J 5/00* (2016.01)
(Continued)

(52) U.S. Cl.
CPC .......... *H02J 3/36* (2013.01); *H01H 9/548* (2013.01); *H01H 33/596* (2013.01);
(Continued)

(58) Field of Classification Search
CPC ... H02J 3/36; H02J 5/00; H01H 9/548; H01H 35/596; H02H 3/16
(Continued)

(56) References Cited

U.S. PATENT DOCUMENTS 3,581,152 A * 5/1971 Hunt ................ H02H 3/16
                                                                   307/328
4,019,115 A    4/1977 Lips
(Continued)

FOREIGN PATENT DOCUMENTS

EP    1 385 259 A2    1/2004
EP    2 071 694 A1    6/2009
(Continued)

OTHER PUBLICATIONS

European Patent Office, "International Search Report and Written Opinion", Dec. 10, 2014, 14 pp.

*Primary Examiner* — Rexford Barnie
*Assistant Examiner* — Terrence Willoughby
(74) *Attorney, Agent, or Firm* — Eckert Seamans; Philip Levy

(57) ABSTRACT

A direct current to alternating current inverter sub-system is for a HVDC distribution system. The DC to AC inverter sub-system includes an enclosure and a DC to DC galvanically isolated buck converter having a DC input electrically connectable to a HVDC cable and a DC output. A DC to AC inverter includes a DC input electrically connected to the DC output of the DC to DC galvanically isolated buck converter and an AC output electrically connectable to an AC transmission line. The DC to AC inverter is mounted in an enclosure with the DC to DC galvanically isolated buck converter, in order that the DC output of the DC to DC galvanically isolated buck converter is directly electrically connected within the enclosure to the DC input of the DC to AC inverter.

8 Claims, 9 Drawing Sheets

(51) Int. Cl.
    *H01H 9/54*         (2006.01)
    *H01H 33/59*      (2006.01)
    *H02H 11/00*      (2006.01)

(52) U.S. Cl.
    CPC ...... *H02H 11/005* (2013.01); *H02J 2003/365* (2013.01); *Y02E 60/60* (2013.01)

(58) Field of Classification Search
    USPC .......................... 307/82; 361/42–55; 363/35
    See application file for complete search history.

(56) References Cited

U.S. PATENT DOCUMENTS

| | | |
|---|---|---|
| 5,345,180 A | 9/1994 | Maier et al. |
| 5,386,147 A * | 1/1995 | Bonneau ................. H02J 3/38 307/64 |
| 5,953,189 A | 9/1999 | Abot et al. |
| 6,822,866 B2 | 11/2004 | Fearing et al. |
| 7,576,447 B2 | 8/2009 | Biester et al. |
| 2005/0029476 A1 | 2/2005 | Biester et al. |
| 2008/0284249 A1* | 11/2008 | Datta ....................... H02J 1/06 307/36 |
| 2009/0146603 A1 | 6/2009 | Sihler et al. |
| 2009/0284999 A1 | 11/2009 | Gibbs et al. |
| 2010/0232190 A1* | 9/2010 | Asplund ................. H02J 3/36 363/35 |

FOREIGN PATENT DOCUMENTS

| | | |
|---|---|---|
| EP | 2 293 407 A1 | 3/2011 |
| WO | 01/84689 A1 | 11/2001 |
| WO | 2012/038100 A1 | 3/2012 |
| WO | 2013/000499 A1 | 1/2013 |

\* cited by examiner

_US 9,673,629 B2_

HIGH VOLTAGE DIRECT CURRENT TRANSMISSION AND DISTRIBUTION SYSTEM

CROSS-REFERENCE TO RELATED APPLICATIONS

This application is a divisional of, and claims priority under 35 U.S.C. §120 from, U.S. patent application Ser. No. 13/901,770, filed May 24, 2013, entitled "HIGH VOLTAGE DIRECT CURRENT TRANSMISSION AND DISTRIBUTION SYSTEM", the contents of which are incorporated herein by reference.

BACKGROUND

Field

The disclosed concept pertains generally to power distribution and, more particularly, to high voltage direct current transmission and distribution systems, such as, for example, such systems for above ground, below ground or subsea applications. The disclosed concept further pertains to circuit interrupters for high voltage direct current distribution systems.

Background Information

Alternating current (AC) power distribution systems are well known.

High voltage, direct current (DC) power distribution systems have less energy losses and require less costly transmission cables than corresponding AC distribution systems. In long transmission lines and, in particular, in ones that use cable, high voltage DC power transmission may be the only feasible method of power transmission because using AC will cause debilitating instability and excessive losses.

When connecting a DC voltage source to a relatively long cable transmission line when the cable capacitance is discharged, relatively large oscillatory currents occur which, in turn, generate relatively large voltage spikes along the cable length. These voltage spikes can compromise the insulation of the cable itself as well as the insulation of any device electrically connected thereto.

Furthermore, the relatively large oscillatory currents can cause nuisance tripping of protection devices of the transmission line.

There is room for improvement in high voltage direct current transmission and distribution systems specifically regarding, for example, the cable charging process when the transmission line is energized.

There is also room for improvement in circuit interrupters for such systems.

SUMMARY

These needs and others are met by embodiments of the disclosed concept in which a direct current to alternating current voltage source inverter is mounted in an enclosure with a corresponding galvanically isolated direct current to direct current converter, in order that a direct current output of the galvanically isolated direct current to direct current converter is directly electrically connected within the enclosure to the direct current input of the direct current to alternating current voltage source inverter.

These needs and others are also met by embodiments of the disclosed concept in which a circuit interrupter for a power circuit of a high voltage direct current distribution system comprises a controller cooperating with the series combination of a solid-state switch and an electromechanical isolation switch to open, close and trip open the power circuit, the controller being structured to repetitively turn on and turn off the solid-state switch when the electromechanical isolation switch is closed, in order to control charging of the power circuit from zero volts to a high direct current voltage.

In accordance with one aspect of the disclosed concept, a high voltage direct current transmission and distribution system comprises: an alternating current to direct current converter including an alternating current input and a direct current output; a first high voltage direct current cable including a first end electrically connected to the direct current output of the alternating current to direct current converter and an opposite second end; and a distribution system comprising: a number of high voltage direct current circuit breakers, each of the number of high voltage direct current circuit breakers including a first portion electrically connected to the opposite second end of the first high voltage direct current cable and a second portion; a number of second high voltage direct current cables, each of the number of second high voltage direct current cables including a first end electrically connected to the second portion of a corresponding one of the number of high voltage direct current circuit breakers and an opposite second end; a number of galvanically isolated direct current to direct current converters, each of the number of galvanically isolated direct current to direct current converters including a direct current input electrically connected to the opposite second end of a corresponding one of the number of second high voltage direct current cables and a direct current output; a number of direct current to alternating current voltage source inverters, each of the number of direct current to alternating current voltage source inverters including a direct current input electrically connected to the direct current output of a corresponding one of the number of galvanically isolated direct current to direct current converters and an alternating current output; a number of alternating current transmission lines, each of the number of alternating current transmission lines including a first end electrically connected to the alternating current output of a corresponding one of the number of direct current to alternating current voltage source inverters and an opposite second end; and a number of alternating current loads, each of the number of alternating current loads electrically connected to the opposite second end of a corresponding one of the number of alternating current transmission lines, wherein each of the number of direct current to alternating current voltage source inverters is mounted in an enclosure with a corresponding one of the number of galvanically isolated direct current to direct current converters, in order that the direct current output of the last such corresponding one of the number of galvanically isolated direct current to direct current converters is directly electrically connected within the enclosure to the direct current input of a corresponding one of the number of direct current to alternating current voltage source inverters.

As another aspect of the disclosed concept, a direct current to alternating current inverter sub-system is for a high voltage direct current distribution system. The direct current to alternating current inverter sub-system comprises: an enclosure; a direct current to direct current galvanically isolated buck converter including a direct current input electrically connectable to a high voltage direct current cable and a direct current output; and a direct current to alternating current voltage source inverter including a direct current input electrically connected to the direct current output of the direct current to direct current galvanically isolated buck converter and an alternating current output electrically connectable to an alternating current transmission line, wherein the direct current to alternating current voltage source inverter is mounted in the enclosure with the direct current to direct current galvanically isolated buck converter, in order that the direct current output of the direct current to direct current galvanically isolated buck converter is directly electrically connected within the enclosure to the direct current input of the direct current to alternating current voltage source inverter.

As another aspect of the disclosed concept, a circuit interrupter for a power circuit of a high voltage direct current distribution system comprises: a first terminal; a second terminal; an electromechanical isolation switch; a solid-state switch electrically connected in series with the electromechanical isolation switch between the first and second terminals; and a controller cooperating with the solid-state switch and the electromechanical isolation switch to open, close and trip open the power circuit, the controller being structured to repetitively turn on and turn off the solid-state switch when the electromechanical isolation switch is closed, in order to control charging of the power circuit from zero volts to a high direct current voltage.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts.

As employed herein, the term "low voltage" shall mean any alternating current voltage that is less than about 1000 $V_{RMS}$ (i.e., a low alternating current voltage), or any direct current voltage that is less than about 1500 VDC (i.e., a low direct current voltage).

As employed herein, the term "medium voltage" shall mean any alternating current voltage greater than a low alternating current voltage and in the range from about 1 $kV_{RMS}$ to about 38 $kV_{RMS}$ (i.e., a medium alternating current voltage), or any direct current voltage greater than a low direct current voltage and in the range from about 1500 VDC to about 50 kVDC (i.e., a medium direct current voltage).

As employed herein, the term "high voltage" shall mean any suitable alternating current voltage greater than a medium alternating current voltage (i.e., a high alternating current voltage), or any suitable direct current voltage greater than a medium direct current voltage (i.e., a high direct current voltage). A high direct current voltage is also equivalently referred to as high voltage direct current (HVDC) herein.

Figure 1:
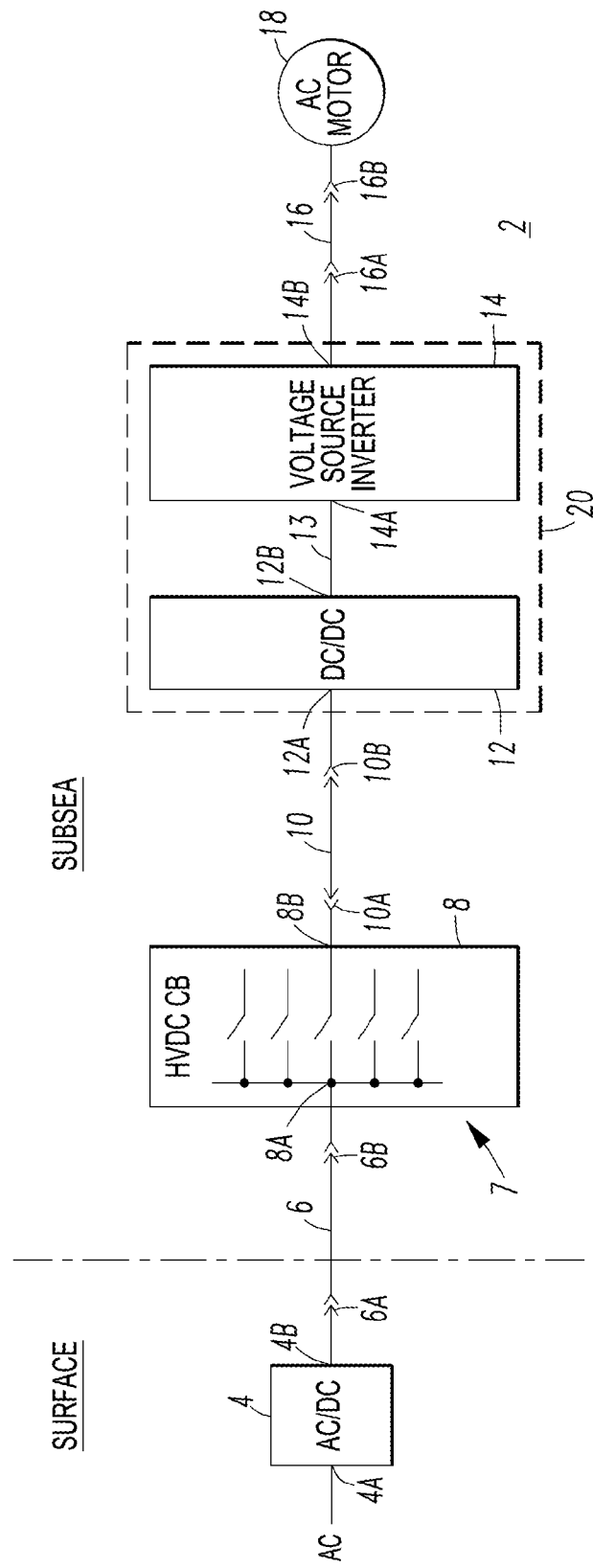
FIG. 1 is a block diagram of an example high voltage direct current (HVDC) transmission and distribution system in accordance with embodiments of the disclosed concept.

Referring to FIG. 1, a high voltage direct current (HVDC) transmission and distribution system 2 includes an alternating current to direct current (AC/DC) converter 4, an HVDC cable 6, and a distribution system 7 including a number of HVDC circuit breakers 8 for a number of branch loads, a number of HVDC transmission lines 10, a number of galvanically isolated direct current to direct current (DC/DC) converters 12, a number of voltage source inverters 14, a number of three-phase transmission lines 16, and a number of AC loads, such as a number of AC motors 18.

In one example embodiment, the AC/DC converter 4 and a portion of the HVDC cable 6 are above the surface of the sea or above ground, and the remaining portion and the rest of the system 2 are subsea or below ground.

In another example embodiment, all of the system 2 is subsea or below ground.

The AC/DC converter 4 includes an AC input 4A and a DC output 4B. The HVDC cable 6 includes a first end 6A electrically connected to the DC output 4B of the AC/DC converter 4 and an opposite second end 6B. Each of the number of HVDC circuit breakers 8 includes a first portion 8A electrically connected to the opposite second end 6B of the HVDC cable 6 and a second portion 8B. Each of the number of HVDC cables 10 includes a first end 10A electrically connected to the second portion 8B of a corresponding one of the number of HVDC circuit breakers 8 and an opposite second end 10B. The number of DC/DC converters 12 are galvanically isolated to avoid ground currents in relatively long HVDC cables, such as 10, and to permit the grounding of one of the phases of the DC to AC output 14B. Each of the number of galvanically isolated DC/DC converters 12 includes a DC input 12A electrically connected to the opposite second end 10B of a corresponding one of the number of HVDC cables 10 and the DC output 12B. Each of the number of DC/AC voltage source inverters 14 includes a DC input 14A electrically connected to the DC output 12B of a corresponding one of the number of galvanically isolated DC/DC converters 12 and an AC output 14B. Each of the number of AC transmission lines 16 includes a first end 16A electrically connected to the AC output 14B of a corresponding one of the number of DC/AC voltage source inverters 14 and an opposite second end 16B. Each of the number of AC loads 18 is electrically connected to the opposite second end 16B of a corresponding one of the number of AC transmission lines 16. Each of the number of DC/AC voltage source inverters 14 is mounted in an enclosure 20 with a corresponding one of the number of galvanically isolated DC/DC converters 12, in order that the DC output 12B thereof is directly electrically connected within the enclosure 20 to the DC input 14A of a corresponding one of the number of DC/AC voltage source inverters 14.

Example 1

The AC/DC converter 4 can be installed on or above the surface of the sea or underwater (e.g., subsea) and is structured to ramp the DC voltage of the DC output 4B at a limited rate in order to avoid high voltage transients in the transmission line of the HVDC cable 6 during its energization. In the case of underwater installation, there is an isolation transformer (not shown) on a platform (not shown) and a multi-pulse transformer and converter (not shown) underwater. This configuration minimizes the ground current at the source.

The HVDC circuit breaker 8, the HVDC cable 10, the galvanically isolated DC/DC converter 12, the DC/AC voltage source inverter 14, the enclosure 20, the AC transmission line 16, and the AC load 18 are either subsea or below ground.

Figure 2:
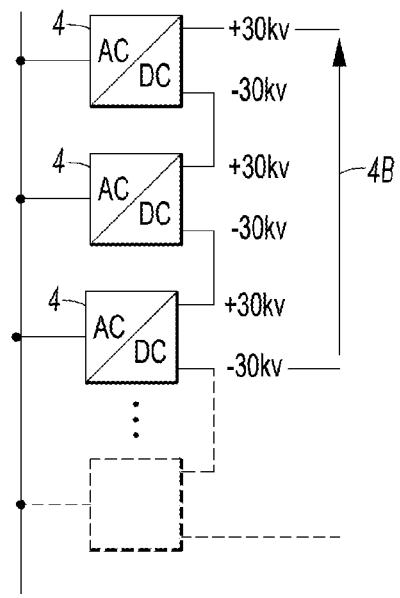
FIG. 2 is a block diagram showing a plurality of alternating current to direct current (AC/DC) converters electrically connected in series for use with the HVDC transmission and distribution system of FIG. 1.
Figure 3:
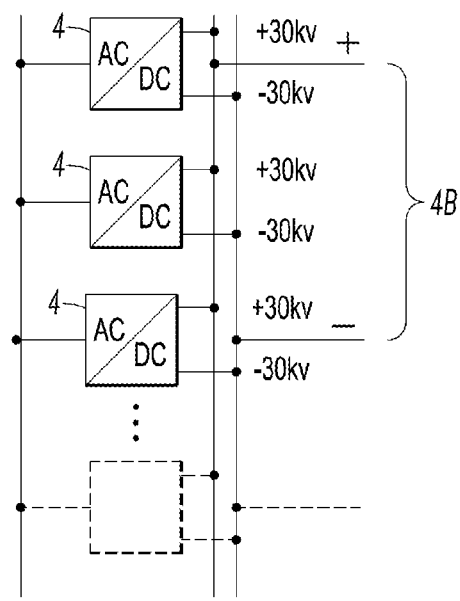
FIG. 3 is a block diagram showing a plurality of AC/DC converters electrically connected in parallel for use with the HVDC transmission and distribution system of FIG. 1.
Figure 4:
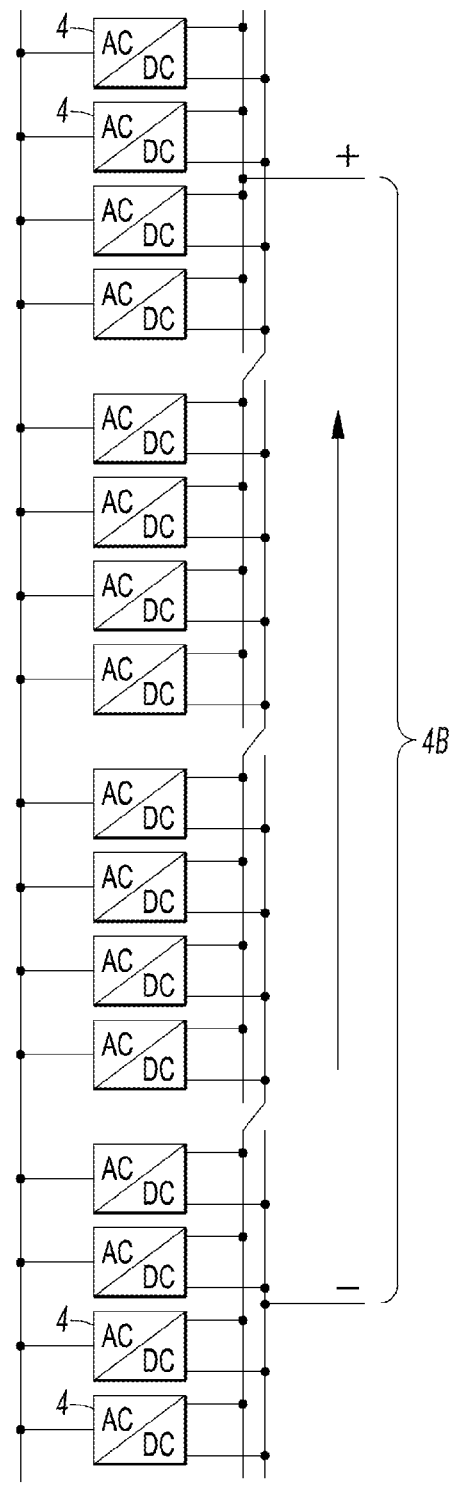
FIG. 4 is a block diagram showing a plurality of AC/DC converters electrically connected in parallel and series for use with the HVDC transmission and distribution system of FIG. 1.

As a non-limiting example, the typical output voltage of the AC/DC converter 4 is +/−5 kV to +/−30 kV and the AC/DC converter 4 can be connected in series (FIG. 2), in parallel (FIG. 3) or in series and in parallel (FIG. 4), in order to scale the output power and/or voltage of the DC output 4B. The AC/DC converter 4 increases the HVDC at a rate that will prevent any high voltage transients from forming during the transmission line energization. Being an active converter, the AC/DC converter 4 is capable of shutting down in case of a short circuit fault in the HVDC cable 6 or in the first input portion 8A of the HVDC circuit breaker 8. Hence, a fault current generated due to a short circuit in the transmission line of the HVDC cable 6 or in the HVDC circuit breaker first input portion 8A is contained by the AC/DC converter 4. If there is such a short circuit, then the AC/DC converter power semiconductor switches (not shown) are turned off to prevent excessive energy to flow in the downstream power circuit.

The AC electrical energy from a generator (not shown) is transformed into DC electrical energy using the AC/DC converter 4, which can be implemented using diodes or active semiconductor switches (not shown). Normally, a multi-pulse AC input 4A is employed in order to reduce the harmonic distortion footprint in the utility. Whether it uses the diodes or the active semiconductor switches, such as IGBTs, the AC/DC converter 4 can have its DC output voltage slowly climb from zero to its rated value (e.g., without limitation, 60 kVDC), although the methods used for each type to achieve the slow output voltage climb are very distinct. The speed of the voltage climb affects the number of frequency components applied to the transmission line of the HVDC cable 6. The faster the voltage climb is, the higher its frequency components. High frequency voltage content will cause the transmission line reactive components to generate voltage transients that normally reach twice the applied voltage (e.g., in the example of a 60 kVDC transmission voltage, the voltage spike generated by a fast voltage climb is about 120 kVDC). This will play havoc with the life of the components in the transmission lines as well as over stress the cable insulation. To avoid this high voltage transient, the disclosed concept reduces the AC/DC converter output DC voltage climb from zero to rated value. This DC voltage climb rate can be adjusted to the cable type and transmission line length if the fastest possible voltage climb is desired or to a predetermined longer rate that will cover any cable type and length.

Preferably, the AC/DC converter 4 is an active converter structured to shut down responsive to a short circuit condition operatively associated with the HVDC cable 6 and/or the circuit breaker 8, and structured to ramp the DC voltage at the DC output 4B thereof at a predetermined rate (e.g., without limitation, 10 kVdc per second for distances up to 100 km; 10 kVdc per two seconds for distances from 100 km to 200 km; 10 kVdc per three seconds for distances greater than 200 km) from zero volts to a suitable HVDC. The same rates are applicable for the HVDC circuit breaker 8.

Example 2

Figure 5:
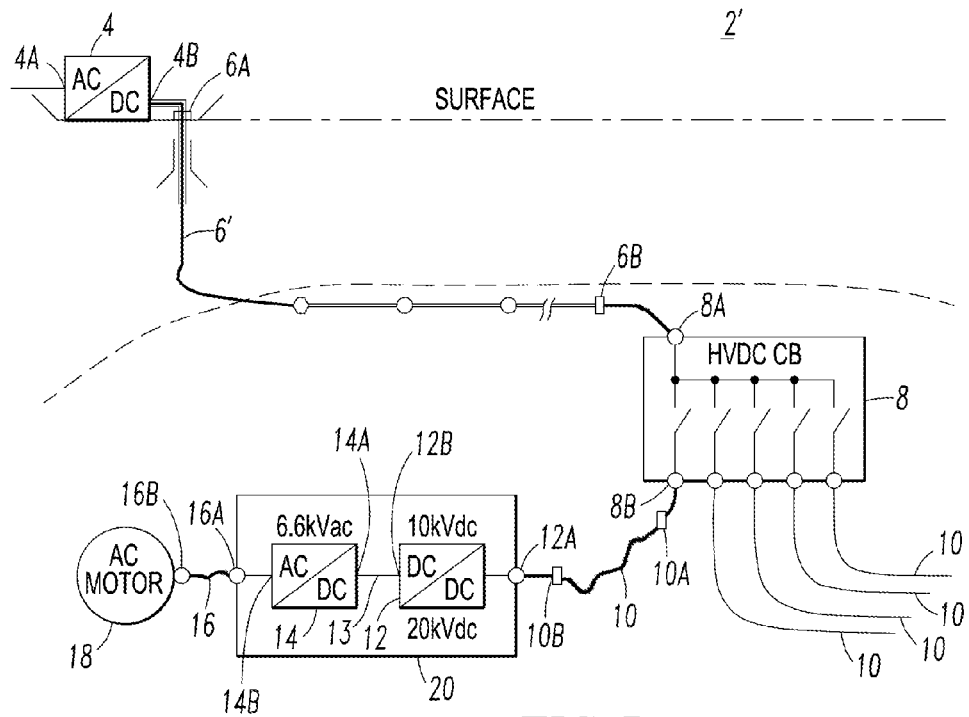
FIG. 5 is a block diagram of another example HVDC transmission and distribution system for subsea applications in accordance with another embodiment of the disclosed concept.

The HVDC cable 6 employs bipolar transmission, and can be partially above ground and partially below ground, partially above sea and partially subsea, entirely subsea, or entirely below ground. For example, FIG. 5 shows another system 2' in which the HVDC cable 6' is partially above sea and partially subsea. No unipolar transmission is allowed in subsea or below ground applications due to galvanic corrosion of components of the enclosures involved.

Example 3

The HVDC circuit breaker 8 includes a cable pre-charge function to prevent high voltage transients in the transmission line of the HVDC cable 10. The HVDC circuit breaker 8 protects a number of branch circuits (e.g., FIG. 5 shows a plurality of branch circuits of plural HVDC cables 10) derived off of the main HVDC transmission line of HVDC cable 6', and pulse width modulates the output 8B to charge the downstream load side transmission line of the HVDC cable 10 to prevent high voltage transients due to cable length. A fault current generated due to a short circuit in the transmission line of the HVDC cable 10 or the input 12A of the galvanically isolated DC/DC buck converter 12 will be contained and isolated by the HVDC circuit breaker 8. As a result, the DC circuit breaker solid-state switches (e.g., 26 of FIG. 16) are turned off to protect the downstream power circuit from excessive energy.

Figure 16:
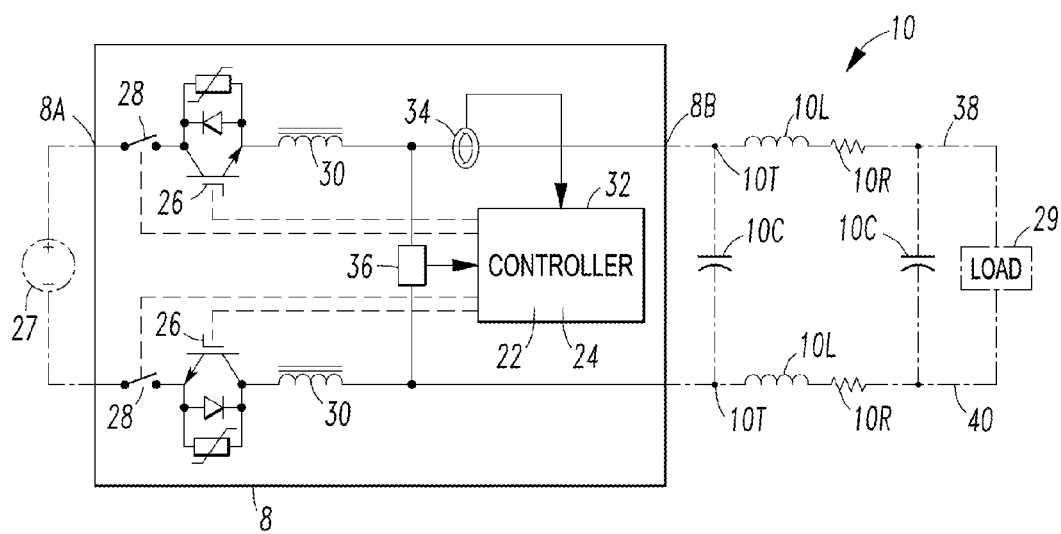
FIG. 16 is a block diagram in schematic form of a HVDC circuit breaker in accordance with another embodiment of the disclosed concept.

The transmission line of the HVDC cable 10 contains resistive 10R, inductive 10L and capacitive 10C components (FIG. 16). The impedance values of these components are proportional to the cable length. When a voltage pulse is applied to the transmission line, the cable resistive and inductive components limit the current magnitude and its rate of change while its capacitive component stores the electric charge transferred by the voltage pulse and defines a voltage magnitude across the cable terminals 10T (FIG. 16). For a given cable length, the magnitude of the current and how quickly it climbs from zero to its rated value is defined by its resistance and inductance, and the amount of voltage across the cable terminals 10T is defined by the cable capacitance.

When the voltage pulse is first applied, the current in the HVDC cable 10 climbs from zero to a maximum value. The rate of the current climb is limited by the cable inductance. If the voltage pulse is long enough, such that the current will reach its maximum value, this maximum value is defined by the cable resistance. As this current flows, in time, it defines an electric charge that is accumulated in the cable capacitance and is reflected in the cable terminals 10T with a voltage magnitude.

By assuming a maximum cable length and, thus, a maximum resistance, inductance and capacitance, a minimum voltage increase can be calculated across the cable terminals 10T when a given voltage pulse is applied. This means that with a given voltage pulse width, a minimum voltage should appear at the cable terminals 10T. If the voltage does not appear or is smaller than the calculated value, it means that there is a short circuit in the transmission line or at the load input.

It also means that a fault in the system 2 can be detected without allowing hundreds or thousands of amperes to flow in the transmission line of the HVDC cable 10 before the fault is detected. This is called a look ahead function (e.g., function 22 of FIGS. 13-16), which looks for the fault before fully energizing the transmission line. The rate of change of the current (di/dt) is defined by the cable inductance (L):

$$di/dt = V/L$$

The steady state current magnitude (i) is defined by the cable resistance (R):

$$i = V/R$$

The voltage (V) produced by the voltage pulse is defined by the cable capacitance (C) and the current that is defined by the cable resistance and inductance:

$$V = i*t/C$$

wherein:

i*t is calculated from the double time integral of the di/dt=V/L plus the time integral of the current, i=V/R, after the current reaches the rated value defined by R and for the rest of the duration of the voltage pulse.

Example 4

Referring to FIGS. 13-16, the hybrid HVDC circuit breaker 8 provides both a short circuit detection, look ahead function 22 and a cable pre-charge function 24. The circuit breaker 8 includes a solid-state switch 26 in series with an electromechanical switch 28. The electromechanical switch 28 is employed solely to galvanically isolate the upstream primary circuit 27 from the downstream secondary circuit 29 being switched on or off solely when no electric current is flowing through it, since the solid-state switch 26 can have leakage current flowing through its semiconductor junction when it is turned off. The advantage of using solid-state switches (e.g., without limitation, IGBT; IGCT), such as 26, is that they can switch on and off much faster than electromechanical switches, such as 28. For example and without limitation, a high voltage IGBT can turn on or off within five microseconds, while an electromechanical switch can take dozens of milliseconds to do the same.

The circuit breaker 8 includes an inductor 30 in series with the solid-state switch 26 and the electromechanical switch 28 to limit the rate of change of the current. Utilizing the switching speed of the solid-state switch 26 and the inductor 30, a relatively simple but effective control strategy is employed to detect a short circuit or a relatively low insulation value in the DC power circuit under protection, such as the example load 29.

Cable transmission lines exhibit an impedance which is composed of inductive, capacitive and resistive components. If the load end is disconnected or the load equipment is turned off, when the circuit breaker 8 is turned on, the DC power source at 27 has to first charge the capacitance of the transmission line of the HVDC cable 10 to reach the source voltage level. The differential equation that defines the voltage across the transmission line capacitance as a function of the injected DC current is shown in Equation 1.

$$Cc*[dV/dt] = i \quad (\text{Eq. 1})$$

wherein:

Cc is the cable capacitance which increases linearly with cable length as a function of its distributed capacitive components 10C;

dV/dt is the derivative of the voltage across the cable positive and negative terminals 10T; and i is the current in the HVDC cable 10.

This means that a DC voltage step increase at the cable terminals 10T can be attained by injecting a current, i, during a time t, as is shown by Equation 2.

$$dV = [i*dt]/Cc \quad (\text{Eq. 2})$$

When the solid-state switch 26 is turned on and off, it generates a current impulse via the inductor 30. For the bipolar transmission line, there are two solid-state switches 26 and there are two inductors 30 as shown in FIG. 16. The current impulse has a duration which is determined by how long the solid-state switch 26 was kept turned on (e.g., i*dt of Equation 2). For a given cable capacitance Cc, the voltage step dV is achieved if there are no leakages due to insulation degradation or due to a short circuit between the positive and negative cable terminals 10T.

If the cable capacitance Cc is known, then the voltage step dV can be determined by turning the solid-state switch 26 on and then off by a known amount of time using Equation 2.

If the cable capacitance Cc is not known, then the current impulse amplitude can be controlled through the inductors 30 by turning the solid-state switches 26 on and then measuring and monitoring the current amplitude by a controller 32 using current sensor 34. When the current amplitude reaches a predetermined value, which should be equal to or less than the solid-state switch maximum current capability, then the controller 32 turns off the solid-state switches 26. The di/dt value is limited by the inductance of the inductors 30 (e.g., L1 and L2) as shown by Equation 3.

$$di/dt = V/[L1+L2] \quad (\text{Eq. 3})$$

If there is no short circuit between the positive and the negative cable terminals 10T, then after the current impulse above, there will be a voltage step developed in the HVDC cable 10. This voltage step is then measured and monitored by the controller 32 using voltage sensor 36. If the voltage is steady, then its value corresponds to the unknown cable capacitance Cc. If a confirmation is needed, then a second current impulse can be injected in the same manner as was described above and the resulting voltage step should be twice as large as the first voltage step.

The above approach can also be used for the known cable capacitance case.

If the monitored voltage step starts to decay within a few seconds, as detected by the controller 32, then this means that there is a current leakage due to an insulation degradation somewhere in the downstream power circuit (e.g., in the HVDC cable 10 or any downstream load such as the DC/DC converter 12).

The disclosed concept uses the controller 32 with the above capabilities to generate the current impulse, limit the current amplitude, and measure and monitor the voltage step as a consequence of the current impulse. The measurement of current and voltage can be achieved using any suitable current and voltage sensors, such as 34,36.

By verifying that the voltage step is present and that it does not change within a couple of seconds, the controller 32 infers that the cable insulation is healthy and that no short circuit is present. This is the look ahead function 22.

The electromechanical isolation switch 28 is in series with the solid-state switch 26, such as for example and without limitation, a power semiconductor switch. The solid-state switch 26 controls and protects against overload and fault currents while the electromechanical switch 28 is used to isolate the downstream protected branch circuit 29 from the upstream power circuit 27 or mains. The electromechanical switch 28 opens and closes at no load. The series combination of the switches 26,28 is electrically connected between first input portion 8A and the second output portion 8B of the HVDC circuit breaker 8. When both of the switches 26,28 are closed, the second portion 8B charges the downstream HVDC cable 10 to or toward a HVDC.

The controller 32 forms a modulation element structured to repetitively turn on and turn off the solid-state switch 26 when the electromechanical isolation switch 28 is closed, in order to control charging of the downstream HVDC cable 10 from zero volts to a HVDC from the first input portion 8A of the HVDC circuit breaker 8. This modulation element ramps a duty cycle of the solid-state switch 26 being on from zero to one hundred percent, as will be described.

The controller 32 also provides a trip mechanism structured to detect a fault downstream of the second output portion 8B of the HVDC circuit breaker 8 responsive to a failure to charge the downstream HVDC cable 10. As will be described, the trip mechanism applies a predetermined current pulse and detects a corresponding predetermined voltage increase of a voltage of the downstream HVDC cable 10. The failure to charge can be caused by a short circuit or an insulation failure of the downstream HVDC cable 10.

As was indicated above, the circuit breaker 8 also includes the cable pre-charge function 24. To resolve the problems of nuisance tripping, relatively large oscillatory currents, and relatively large voltage spikes along the cable length when connecting a DC voltage source to a relatively long cable transmission line, the disclosed hybrid DC circuit breaker 8 can be used to charge the cable capacitance Cc by utilizing the relatively fast switching capability of the solid-state switches 26 and the current limiting characteristic of the inductors 30.

After the controller 34 verifies that there is no short circuit and no cable insulation degradation, the controller 34 employs further current impulses to continue to charge the cable capacitance Cc, such as formed by the distributed capacitance components 10C. Then, after the controller 34 detects that the HVDC cable 10 is fully charged, the solid-state switches 26 will remain turned on.

A relatively longer HVDC cable 10 will take relatively more current impulses and will take a relatively longer time to charge to the rated source DC voltage with the solid-state switches 26.

In one embodiment, the controller 32 predefines the current impulse frequency and duty cycle, and then adjusts them by the thermal capacity of the hybrid circuit breaker 8 and by the solid-state switch maximum current capability. In other words, the current impulse amplitude should be equal to or smaller than the solid-state switch maximum current, and the frequency of the impulses should not be so high that it will cause the solid-state switches 26 to overheat.

In FIG. 16, the voltage source 27 provides a relatively constant DC voltage amplitude to the HVDC cable 10 and to the downstream load 29 via the hybrid circuit breaker 8 as long as its output current capability is not exceeded.

The disclosed concept can be employed for both unipolar and bipolar DC power transmission even though for subsea or underground applications the system should be bipolar to avoid galvanic corrosion effects when using the ground or the water as the return path for the electric DC current. Unipolar is the transmission mode where the earth (or sea water) is used as the return path. In this case, only one pole is transmitted in an isolated cable. The return path is usually a buried graphite rod (not shown) on both ends of the transmission line coupled to a cable (not shown) that is then electrically connected to the equipment, such as 29. The bipolar transmission mode, shown in FIG. 16, uses two conductor cables 38,40, one for the positive pole and one for the negative pole.

Every DC current impulse from the HVDC circuit breaker 8 adds to the cable voltage by accumulating electric charge in the cable capacitance Cc (Equation 2), but the impulse duration is short enough to prevent the current from reaching an amplitude that will cause high voltage transients. The current amplitude is advantageously limited by: (1) the impulse duration (which is controlled by the controller 32); (2) the HVDC bus voltage amplitude; and (3) the inductance of the inductors 30 (e.g., reactors).

The cable capacitance Cc varies linearly with the cable length and, thus, as the cable length increases, the cable capacitance Cc increases proportional to the length increase. For a given current impulse (amplitude and time), the voltage across the cable terminals 10T decreases inversely proportional to the cable length increase.

This means that for a particular current impulse pattern (if fixed by the controller 32), relatively more impulses are needed to charge the HVDC cable 10 to its desired or rated voltage as the cable length increases. On the other hand, if the cable capacitance Cc is preloaded (e.g., without limitation, manually) to the controller 32, then it can adjust the current impulse to keep the pre-charge time the same. This can also be achieved automatically by applying a predetermined current impulse and expecting an ideal voltage step as a consequence. If the measured voltage is much lower than expected and it does not decay rapidly within a couple of seconds, then this means that the cable capacitance Cc is relatively higher than expected. Otherwise, if the measured voltage is much higher than expected as a consequence of the predetermined current impulse, then this means that the cable capacitance Cc is relatively lower than expected. In either case, the controller 32 can suitably adjust the current impulse to achieve the ideal or desired cable charging time.

Figure 13:
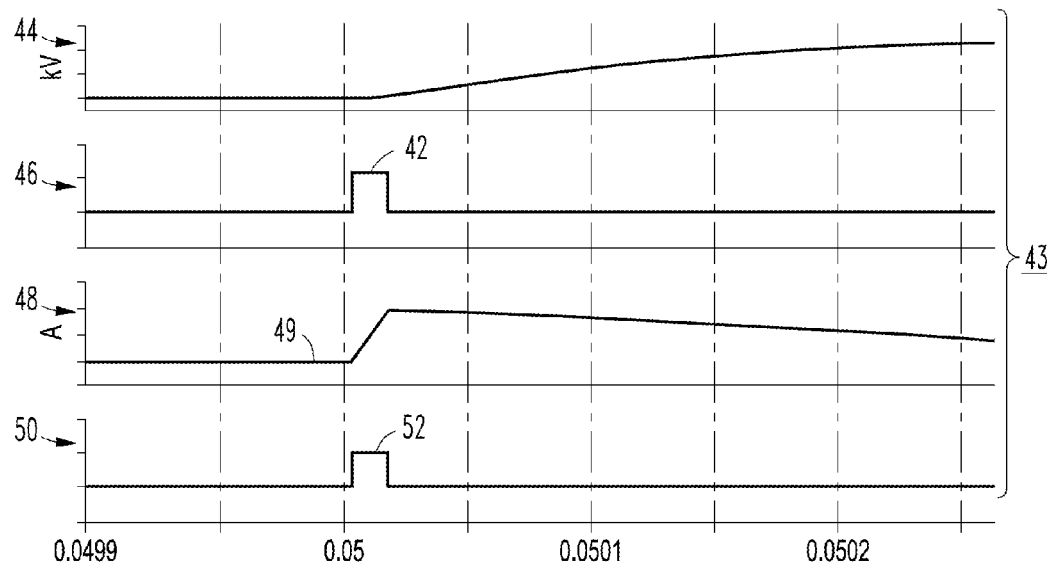
FIGS. 13-15 are plots of DC bus voltage, a number of generated voltage pulses, a number of generated current pulses, and a number of gate command signals for different portions of a pre-charge cycle of a HVDC circuit breaker in accordance with another embodiment of the disclosed concept.

FIG. 13 shows the first pulse 42 of a pre-charge cycle 43 of the pre-charge function 24, which is also employed for the short circuit detection, look ahead function 22 of FIG. 16. The desired DC bus voltage in this example is 60 kVDC. The first plot 44 shows the DC bus voltage after the circuit breaker 8 switches at the cable input 10A. The example voltage reached after the first pulse 42 of the second plot 46 is 2.6 kVDC. Otherwise, if the cable insulation is compromised, then this voltage will decrease rapidly. The second plot 46 shows the voltage pulse 42 generated when the circuit breaker solid-state switches 26 are turned on and then off. The example voltage pulse amplitude is 60 kVDC. The third plot 48 shows the current pulse 49 generated by the voltage pulse 42 and through the inductors 30. The example current pulse amplitude of 200 A is limited by the controller 32. The fourth plot 50 shows the circuit breaker solid-state switches 26 gate command signal 52 from the controller 32.

Figure 14:
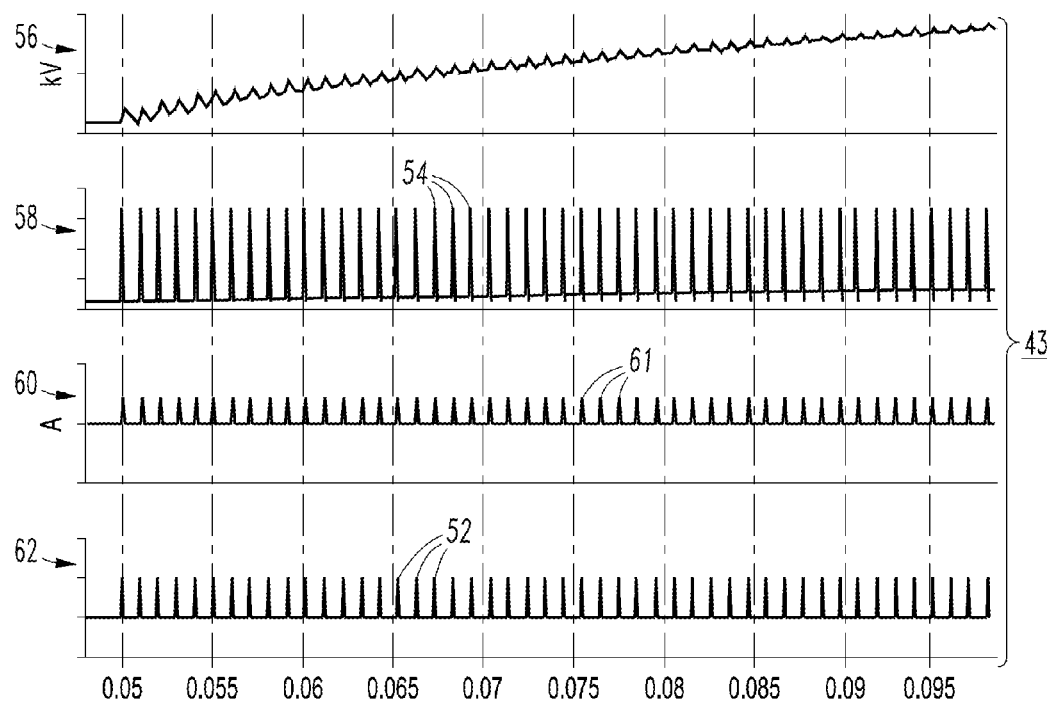

FIG. 14 shows the first fifty example pulses 54 of the pre-charge cycle 43. Again, the DC bus voltage before the circuit breaker 8 switches in this example is 60 kVDC. The first plot 56 shows the DC bus voltage after the circuit breaker 8 switches at the cable input 10A. The example voltage reached after the first fifty example pulses 54 is 9 kVDC. The second plot 58 shows the voltage pulses 54 generated when the circuit breaker solid-state switches 26 are turned on and then off. The example voltage pulse amplitude is 60 kVDC. The third plot 60 shows the current pulses 61 generated by the voltage pulses 54 and through the inductors 30. The example current pulse amplitude of 200 A is limited by the controller 32. The fourth plot 62 shows the circuit breaker solid-state switches 26 gate command signals 52 from the controller 32.

Figure 15:
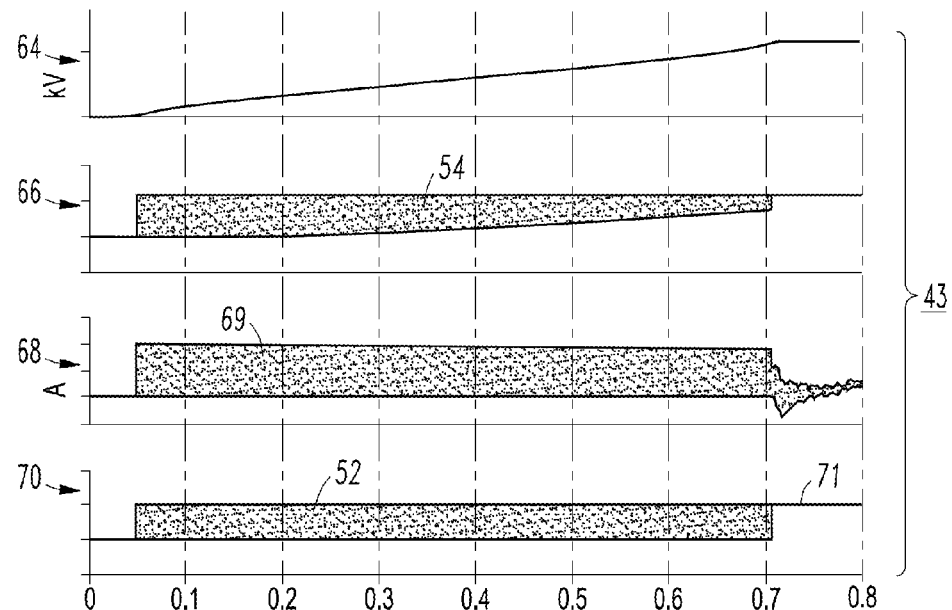

FIG. 15 shows the full pre-charge cycle 43. Again, the DC bus voltage before the circuit breaker 8 switches in this example is 60 kVDC. The first plot 64 shows the DC bus voltage after the circuit breaker 8 switches at the cable input 10A. The voltage reached after the pre-charge cycle is 60 kVDC. The second plot 66 shows the voltage pulses 54 generated when the circuit breaker solid-state switches 26 are turned on and then off. The voltage pulse amplitude is 60 kVDC. The third plot 68 shows the current pulses 69 generated by the voltage pulses 54 and through the inductors 30. The current pulse amplitude of 200 A is limited by the controller 32. The fourth plot 70 shows the circuit breaker solid-state switches 26 gate command signal 52 from the controller 32. The command signal 52 stays high or turned-on fully at 71 after the pre-charge cycle 43 is complete.

For the pre-charge function to work on a relatively long cable, the inductors 30 of FIG. 16 are not needed per se because the cable inductance will limit the di/dt. However, the inductors 30 are paramount during a short-circuit (e.g., without limitation, directly right at the output 8B of the HVDC circuit breaker 8 in which case no cable inductance will limit the di/dt).

The cable pre-charge function 24 of the HVDC circuit breaker 8 prevents high voltage transients in the HVDC transmission line of the HVDC cable 10. The DC energy from the output 4B of the AC/DC converter 4 is transmitted to the HVDC circuit breaker 8 via the HVDC cable 6 (e.g., without limitation, which can be dozens of miles long). The voltage transient in this segment while it is energized is mitigated by the relatively slow climb of the AC/DC converter output voltage. This potential arrives at the input 8A of the HVDC circuit breaker 8 whose output 8B feeds the HVDC cable 10 that feeds the corresponding galvanically isolated DC/DC converter 12, which powers the corresponding DC/AC voltage source inverter 14.

To avoid the same issue described above in connection with the AC/DC converter 4 ramping the DC voltage at a limited rate as to avoid high voltage transients in the transmission line of the HVDC cable 6, the output 8B of the HVDC circuit breaker 8 is not switched on normally. Instead, the HVDC circuit breaker solid-state switches 26 are commanded on and off at relatively very short time segments. The solid-state switches 26 intended for the use in 60 kVDC circuit breakers can be switched on or off within a few microseconds. This feature allows for the HVDC circuit breaker output 8B to be modulated to permit a controlled charging of the cable capacitance Cc and consequently a slow climb of the cable voltage to avoid the two times voltage transient. Moreover, with this feature, the HVDC circuit breaker 8 can also detect a fault in the transmission line of the HVDC cable 10 or at the input 12A of the DC/DC converter 12 by turning on and off. Therefore, the pre-charge and the look ahead functions are operating simultaneously.

As one non-limiting example, the controller 32 limits the current to 200 A or less when the 60 kVdc voltage is switched on and off, and the current derivative is limited by the inductors 30 in series with both positive and negative cables. When the HVDC cable 10 is fully discharged, its voltage Vc is equal to zero volts between the positive and negative cables, and the first pulse will have a current derivative defined by:

$$di/dt = (60 \text{ kVdc} - Vc)/L$$

wherein:
L is the sum of the inductances of both inductors 30 (L1 and L2);
Vc is the instantaneous cable voltage;
di is 200 A;
dt is the time required to reach di; and
60 kVdc is the input voltage from the AC/DC converter 4.
This means that:

$$dt = (di*L)/(60 \text{ kVdc} - Vc)$$

wherein:
dt represents the on-time of the circuit breaker solid-state switch 26 and, thus, with the corresponding off-time, defines the modulation duty cycle. As the pulses build the voltage Vc in the cable capacitance, the difference (60 kVdc−Vc) diminishes, which increases dt and, thus, the duty cycle. When Vc reaches 60 kVdc, the difference (60 kVdc−Vc) equals zero and dt goes to infinity, which means that the solid-state switch 26 is continuously turned on.

Example 5

The galvanically isolated buck DC/DC converter 12 allows for the motor output 14B of the DC to AC voltage source inverter 14 to have one of its three phases grounded. The DC/DC converter 12 is isolated and reduces the HVDC coming from the source to a DC voltage level that is compatible with the motor insulation rating. This reduced voltage is fed into the input DC bus 14A of the DC/AC voltage source inverter 14 whose output 14B feeds the AC transmission line 16 and subsequently the AC motor 18. The galvanic isolation reduces the effective zero sequence currents that may flow to the three-phase cable 16 and the AC motor 18. This isolation allows shorting to ground of one of the motor phases with no operational interruption. The DC/AC voltage source inverter 14 is an active converter and, thus, the output 14B thereof is protected against short circuit faults.

The galvanically isolated DC/DC buck converter 12 in the same enclosure 20 as the DC/AC voltage source inverter 14 allows for the transmission of power at high voltage up to the input 14A of the voltage source inverter 14, which reduces the current levels and consequently the voltage transients due to current changes in the HVDC transmission line of the HVDC cable 10 and better utilization of the cable conductor cross section. Also, a fault current generated due to a short circuit in the input 14A of the voltage source inverter 14 will be contained by the DC/DC buck converter 12.

The high power AC motor 18 is designed for medium voltage to reduce the copper cross section of its windings and of the corresponding supply cable 16. The "buck" aspect of the galvanically isolated DC/DC buck converter 12 reduces the high direct current voltage from the corresponding HVDC cable 10 to a medium direct current voltage. Typically, for subsea applications, the AC motors 18 are rated, for example and without limitation, for 4160 V or 6600 V input. The insulation rating for a 6600 V motor is 20 kVDC or 14,200 $VAC_{RMS}$. If power is transmitted from a surface platform (see the AC/DC converter 4 of FIG. 5) to the motor 18 subsea at about 60 kVDC, then this voltage is three times higher than the motor's insulation voltage rating. Therefore, at some point in the transmission line, the 60 kVDC has to be reduced to well below 20 kVDC. For the inverter 14 to produce a 6600 VAC output, its input voltage needs to be around 10 kVDC. Hence, the DC/DC converter 12 reduces the transmitted 60 kVDC, in this example, to 10 kVDC.

Subsea cables are relatively expensive, such as about $1000 per meter not counting the installation cost. The largest cables for subsea applications would be ideally limited to around 240 square millimeters due to sheer size and weight which affect the cost and difficulty of installation. This means that the electric current is limited by the copper cross section. For 240 square millimeters, the maximum payload current is between 400 A to 500 A depending on the top side and water temperature conditions.

In order to transmit power effectively, a high voltage is needed as close to the load 18 as possible, in order to reduce the amount of current in the transmission line and thus reduce the conductor cross section, which in the subsea case, has a limit due to installation restrictions. This is provided by the inclusion of the DC/DC buck converter 12 with the inverter 14 whose output 14B feeds the AC motor 18. In the above example, the 60 kVDC is transmitted all the way to the point of delivery and the system 2 can benefit from the lower current up to that point. Continuing to apply this concept to the above example, with a 450 A maximum cable current and 60 kVDC, the transmission line can carry 27 megawatts. With the same 450 A limitation and 10 kVDC, the maximum power transmitted is 4.5 megawatt.

The disclosed "in the same box" configuration of the DC/DC buck converter 12, the inverter 14 and the enclosure 20 reduces current levels and consequently voltage transients due to current changes in the transmission line of the HVDC cable 10 and provides better utilization of the cable conductor cross section. Better utilization of the cable conductor cross section was explained, above. The reduction of voltage transients is a consequence of the reduction of current magnitude. The formula for voltage transients in a transmission line can be simplified to obtain:

$Vtrans = L*di/dt$ wherein:

Vtrans is the peak voltage transient which goes above the DC transmission voltage;

L is the inductance of the transmission line; and di/dt is the current transient which is higher in the presence of solid-state switching devices switching loads on or off.

Therefore, for the same switching time, dt, a smaller current magnitude, di, will produce a smaller transient voltage.

The galvanically isolated DC/DC buck converter 12 allows for the output to the AC motor 18 to be grounded in one of the phases. The system grounding is complex when it comes to DC transmission. The generators on a surface platform (e.g., FIG. 5) will be generally high impedance grounded. The output of the AC/DC converter 14 is also high impedance grounded via its neutral point. When using a DC/DC converter 12 that is isolated from the source on the platform, it means that the inverter circuit connected to its output 12B is electrically floating with reference to the source. Therefore, if any one of the inverter's output terminals 14B is connected to ground, then there is no ground current that flows in the source.

If there is a short circuit operatively associated with the DC input 14A of the corresponding voltage source inverter 14 (e.g., without limitation, in the inverter components (not shown)), then the power semiconductor switches (not shown) of the galvanically isolated DC/DC buck converter 12 are turned off to shut down the converter 12, thus, protecting the inverter 14 from excessive fault energy.

Example 6

The voltage source inverter 14 inputs from the DC input 14A and outputs AC from the output 14B to the AC motor 18. Due to the possibility of relatively long electrical connections between the inverter output 14B and the AC motor 18, there can be a suitable filter (not shown) to minimize common mode and harmonic currents. The inverter 14 protects the three-phase transmission lines 16 and the motor windings (not shown) in case of a short circuit fault. The inverter output 14B has a filter (not shown) to suppress the pulse width modulation transients allowing for a relatively long transmission line cable 16 to the AC motor 18. The inverter 14 employs a selective harmonic elimination modulation method to minimize the filter size.

A fault current generated due to a short circuit in the transmission lines 16 or the AC motor 18 will be contained by the inverter 14.

The voltage source inverter 14 has a relatively large capacitor (not shown) connected between the positive and the negative terminals of its input DC bus 14A. In contrast, a current source inverter (not shown) does not have such as capacitor, but does have a relatively large inductor (not shown) in series with its DC bus positive and/or negative terminals (not shown) of its input DC bus.

The distribution system 7 is divided into sections that are protected by different elements in the circuit. The AC motor 18 is protected by the inverter 14. If there is a short circuit in the three-phase transmission lines 16 between the inverter 14 and the motor 18 or in the motor 18 itself, then the inverter semiconductor switches (not shown) are turned off to stop the fault current that is detected by the inverter control circuit (not shown).

The alternating current output 14B of the voltage source inverter 14 can be a low alternating current voltage, a medium alternating current voltage, or a high alternating current voltage.

Example 7

The three-phase transmission lines 16 can employ low, medium or high voltage AC.

Example 8

The AC motor 18 can be a low, medium or high voltage AC motor, such as a three-phase AC motor.

Example 9

The enclosure 20 is preferably compensated for subsea pressure. For example and without limitation, U.S. Pat. No. 6,822,866 discloses a power conversion system that is void of air by the vacuuming and immersion of power conversion system components in a dielectric gel, oil, gas or in vacuum. This permits the high voltage circuit to become much smaller than it would be in air. To build a pressure compensated power conversion system, its components are immersed in a fluid that: (1) fills all gaps and voids in the converter structure in order to allow the pressure in the enclosure 20 to be equalized with the external pressure; (2) is dielectric in nature and inert to prevent chemical corrosion of components immersed therein; and (3) transports heat energy generated in the DC/DC converter components to the walls (not shown) of the enclosure 20.

Example 10

The disclosed concept permits the cable size of the three-phase transmission lines 16 to be relatively smaller and to get increasingly smaller as it gets closer to the AC motor 18 due to the decreasing sea water temperature as the cable goes deeper. One umbilical cable is for 20,000 MW (e.g., maximum cable size has to do with its temperature rating and the limitations imposed by the I-tube (e.g., without limitation, a straight vertical tube that is typically 220 feet long, encases the power cable (or "umbilical"), is physically attached to the platform structure, and protects the cable against sea-induced motions), which supports and holds the cable that leaves the oil platform at sea level as it goes down into the sea bed; there is a length of cable that the I-tube grabs and thus constrains the cable cooling and thus requires the worst case conductor cross section; as the transmission line increases in the subsea region, the water temperature drops dramatically and the cable could have its conductor cross section reduced from a given splice point). This permits transmission of DC power until a few meters from the drive/motor system at the voltage source inverter 14. The voltage drop due to relatively long cable length and load power variation is compensated by the AC/DC converter 4 and the DC/DC converter 12 regulates the DC bus voltage of the inverter 14 to provide full 6.6 kV to the AC motor 18 regardless of the cable length or load variation. The voltage source inverter 14 to AC motor 18 cable distance can be reduced to less than 150 feet. Performance and control are improved and there is no need for expensive filters.

Example 11

The disclosed concept can employ a surface or sea-bed installed AC to DC (typically 10 kVDC to 240 kVDC scalable) two-wire (+, −configured) power conversion assembly fed by a single umbilical cable to a HVDC switchgear assembly comprised of one or multiple solid-state protected and controlled HVDC circuit breakers 8 in a pressure compensated enclosure (not shown but see Example 9) to withstand, for example, a minimum of 300 bar of pressure and 3 kM of sea water depth.

Example 12

The individual sea-bed switchgear breakers 8 or single group mounted switchgear breakers 8 could feed various AC or DC loads, such as the example AC motors 18, on the sea-bed including the voltage source inverter 14 up to and exceeding 13.8 kVAC output voltage.

Example 13

Figure 6A:
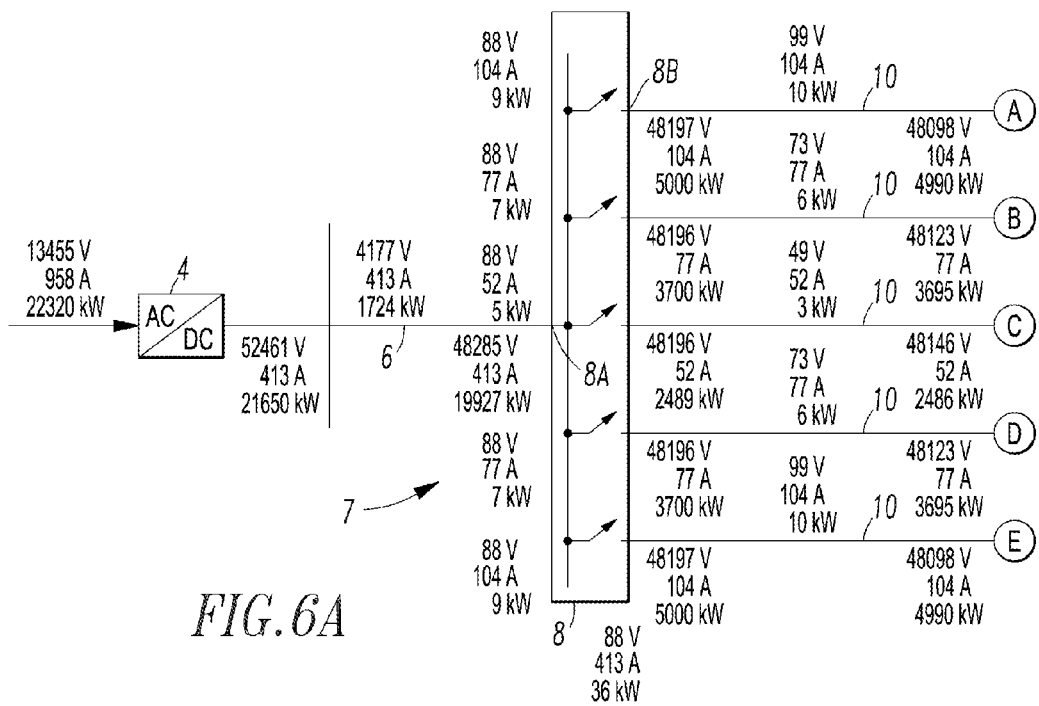
FIGS. 6A-6B form a block diagram of another example HVDC transmission and distribution system for subsea applications in accordance with another embodiment of the disclosed concept.
Figure 6B:
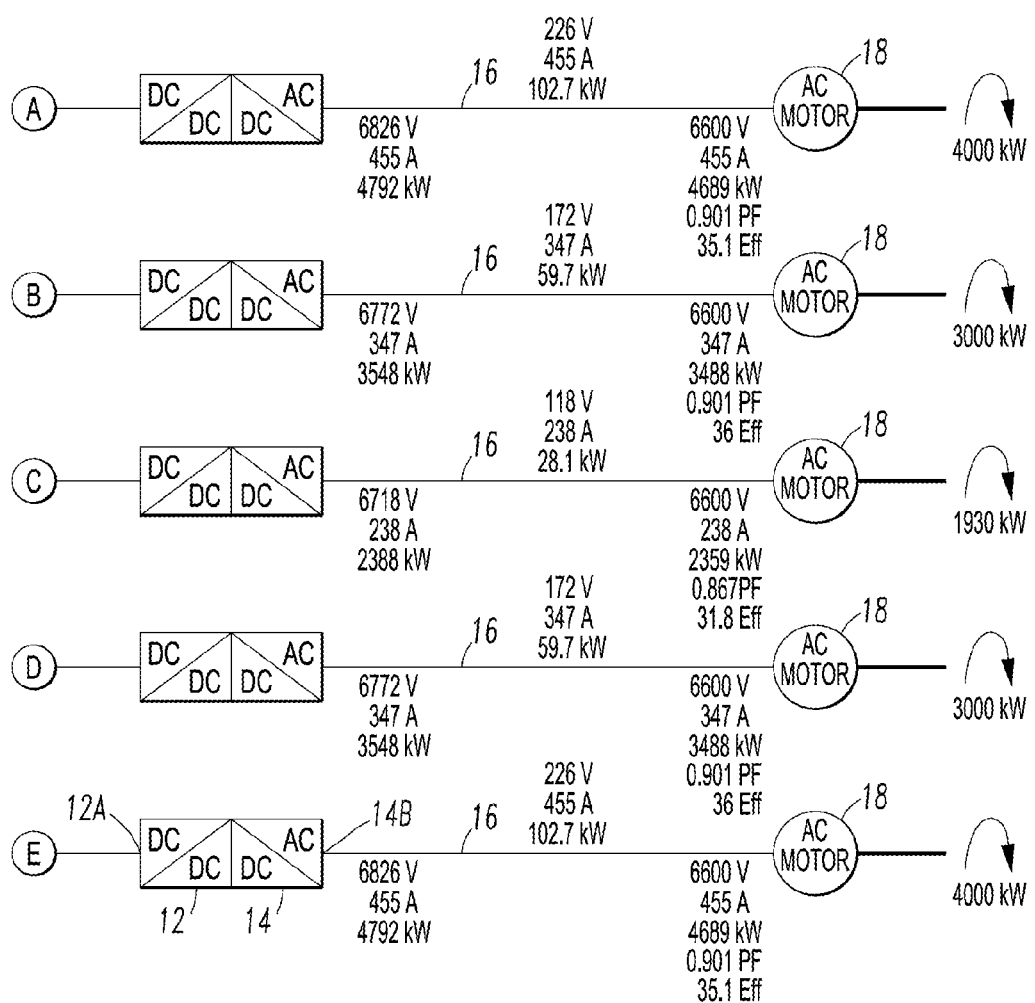

FIGS. 6A-6B show an example distribution system 7 according to the disclosed concept, as powered by the AC/DC converter 4 and the HVDC cable 6, including the subsea switch gear 8, plural cables 10, plural drives each formed by the DC/DC buck converter 12 and the voltage source inverter 14, plural cables 16 and plural AC motors 18. Example electrical and cable parameters are also shown. Due to the example system disclosed here, the transmission and distribution cables never conduct a current higher than the 450 A limit.

Example 14

Figure 7:
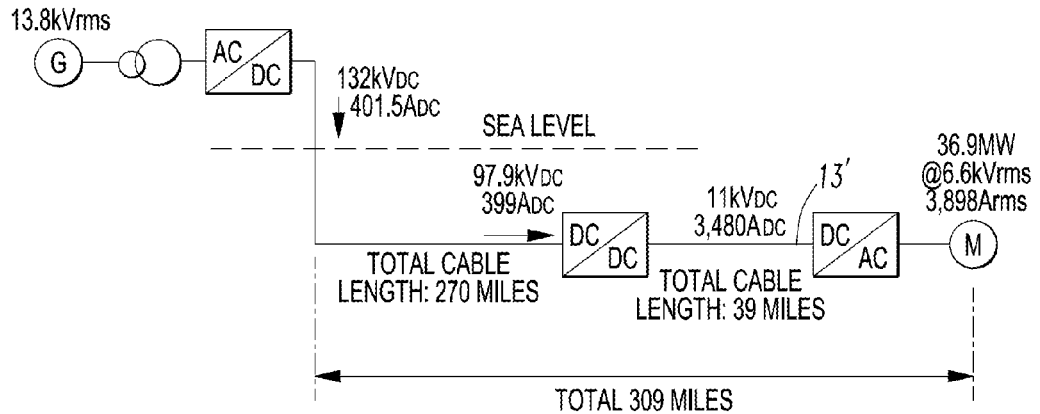
FIG. 7 is a block diagram of an HVDC transmission and distribution system for subsea applications.
Figure 8:
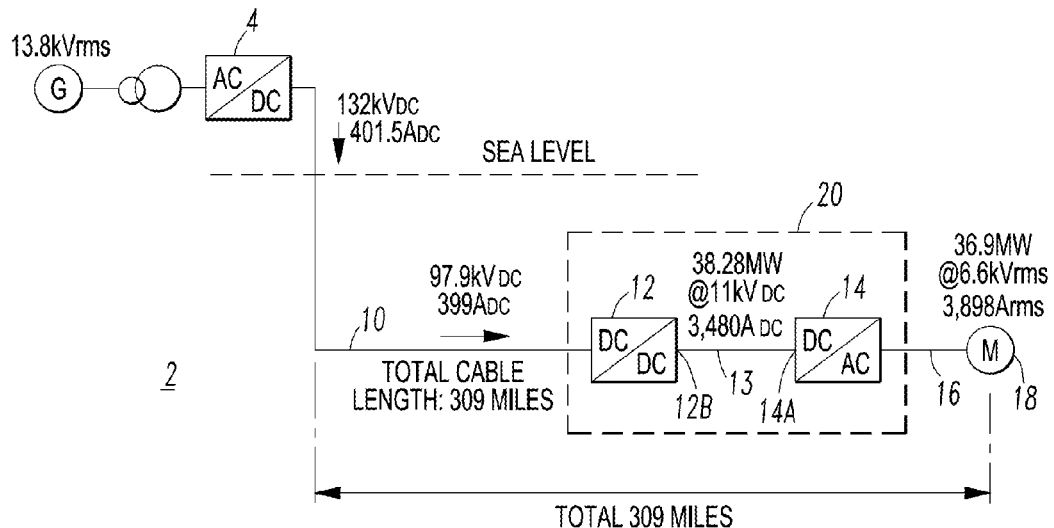
FIG. 8 is a block diagram of another example HVDC transmission and distribution system for subsea applications in accordance with another embodiment of the disclosed concept.

FIGS. 7 and 8 show differences between a prior system 2' and a non-limiting example of the disclosed system 2, except simplified to remove the HVDC circuit breaker 8. The case in FIG. 7 shows the consequence of reducing the DC voltage midway and the other case in FIG. 8 shows the advantages of having the DC/DC converter 12 in the same enclosure 20 (FIG. 1) as the inverter 14. The example cable parameters accurately reflect real world parameters. In both cases, the AC/DC converter 4 transmits 132 kVdc and 401 A via a 270 mile cable in FIG. 7 and a 309 mile cable in FIG. 8. Due to the resistive losses in the cable in FIG. 7, the input voltage at the input of the DC/DC converter 12 is 97.9 kV while in FIG. 8 it is 92.9 kVdc. By transmitting the high DC voltage on the HVDC cable 10 up to the drive enclosure 20 in FIG. 8, which includes the buck DC/DC converter 12 (which reduces 92.9 kVDC to 11 kVDC), this avoids any substantial length of cable 13' (FIG. 7) carrying a current of 3480 Adc and needing a ten times higher cross section than the 240 sq. mm. HVDC cable 10 in the example. Instead, the relatively short conductor bus (e.g., a few feet of length) 13 (FIG. 8) carries 3,480 ADC at 11 kVDC to transmit the same amount of load power.

FIGS. 9-12 show modular distribution systems 100,200, 300,400, respectively.

Example 15

Figure 9:
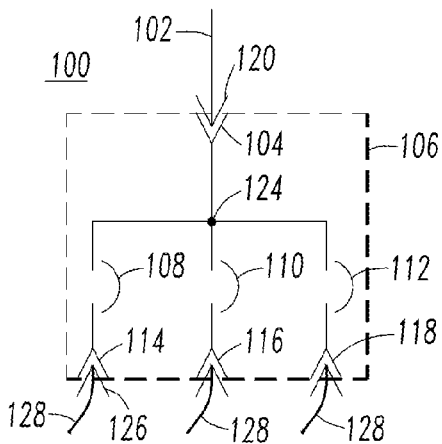
FIGS. 9-12 are block diagrams of modular circuit breaker distribution mechanisms for use with the HVDC transmission and distribution system of FIG. 1.

FIG. 9 shows a supply cable 102 (e.g., such as HVDC cable 6 of FIG. 1) electrically connected to a line (e.g., supply) plug 104 of a single circuit breaker enclosure 106 having three example branch circuit breakers 108,110,112, each of which has a load plug 114,116,118, respectively. The example branch circuit breakers 108,110,112 are HVDC circuit breakers, the same as or similar to the HVDC circuit breaker 8 of FIG. 1, and are enclosed by the example single enclosure 106. The single line plug 104 is externally electrically connected to the opposite second end 120 of the HVDC cable 102 and is internally electrically connected to a first input portion 124 of the HVDC circuit breakers 108,110,112. Each of the load plugs 114,116,118 is externally electrically connected to a first input end 126 of a corresponding HVDC cable 128.

Example 16

Figure 10:
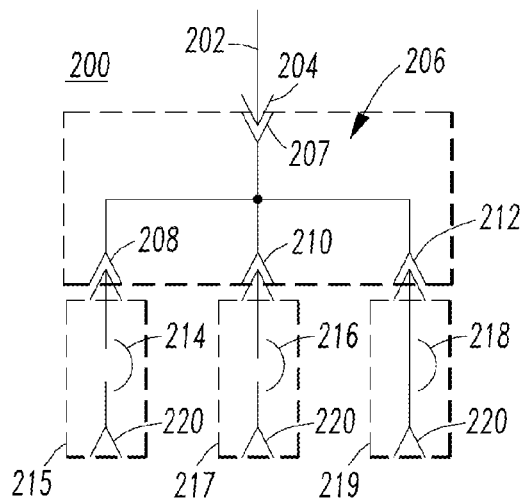

FIG. 10 shows the supply cable 202 electrically connected to a line (e.g., supply) plug 204 of a distribution module 206 having an input 207 and three example output plugs 208, 210,212, each of which engages a separate HVDC branch circuit breaker 214,216,218, each of which has a load plug 220 and is enclosed by a corresponding enclosure 215,217, 219, respectively.

Figure 11:
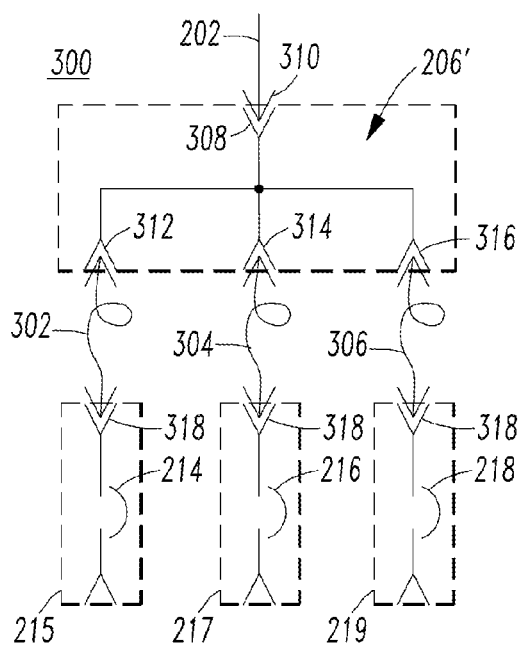

FIG. 11 is similar to FIG. 10 except that the distribution module 206' is interconnected with the HVDC branch circuit breakers 214,216,218 by three external cables 302,304,306, respectively. The distribution module 206' has an input 308 electrically connected to the opposite second end 310 of the supply cable 202 and a plurality of outputs 312,314,316. Each of the outputs 312,314,316 is electrically connected to the input portion 318 of a corresponding one of the HVDC circuit breakers 214,216,218.

Example 17

Figure 12:
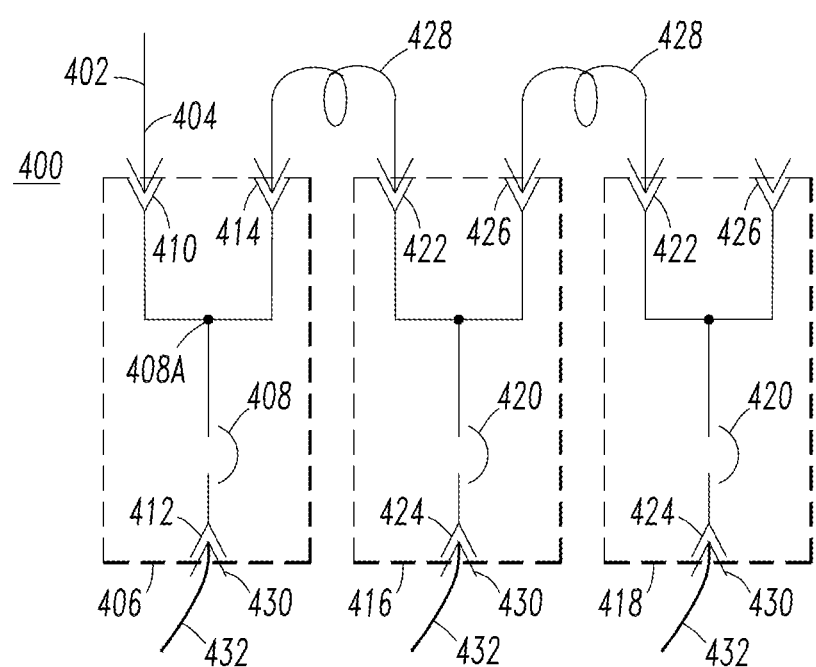

FIG. 12 shows a supply cable 402 electrically connected to a line (e.g., supply) plug 410 of a circuit breaker enclosure 406 having one branch circuit breaker 408 including the line plug 410, a load plug 412 and a daisy chain plug 414. Two other circuit breaker enclosures 416,418, each having one branch circuit breaker 420 including a line plug 422, a load plug 424 and a daisy chain plug 426, are interconnected with the first circuit breaker enclosure 406 by daisy chain cables 428 electrically connected between the daisy chain plug 414 or 426 of a prior circuit breaker enclosure 406,416 and the line plug 422 of another circuit breaker enclosure 416,418.

The line plug 410 of the enclosure 406 is externally electrically connected to the opposite second end 404 of the HVDC cable 402 and internally electrically connected to the plug 414 and the input portion 408A of the HVDC circuit breaker 408. For the HVDC circuit breakers 420, the jumper cables 428 electrically connect the plugs 414 and 422 or 426 and 422. Each of the load plugs 412,424 is externally electrically connected to the first end 430 of a corresponding HVDC cable 432.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A direct current to alternating current inverter sub-system for a high voltage direct current distribution system, said direct current to alternating current inverter sub-system comprising:
    an enclosure;
    a direct current to direct current galvanically isolated buck converter including a direct current input electrically connectable to a high voltage direct current cable and a direct current output, wherein the direct current to direct current galvanically isolated buck converter is structured to provide galvanic isolation between the direct current input and the high voltage direct current cable to avoid ground currents in the high voltage direct current cable; and
    a direct current to alternating current voltage source inverter including a direct current input electrically connected to the direct current output of said direct current to direct current galvanically isolated buck converter and an alternating current output electrically connectable to an alternating current transmission line, wherein said direct current to alternating current voltage source inverter is mounted in said enclosure with said direct current to direct current galvanically isolated buck converter, in order that the direct current output of said direct current to direct current galvanically isolated buck converter is directly electrically connected within the enclosure to the direct current input of said direct current to alternating current voltage source inverter.

2. The direct current to alternating current inverter sub-system of claim 1 wherein said enclosure is compensated for subsea pressure.

3. The direct current to alternating current inverter sub-system of claim 1 wherein said direct current to direct current galvanically isolated buck converter is structured to shut down responsive to a short circuit condition operatively associated with the direct current input of said direct current to alternating current voltage source inverter.

4. The direct current to alternating current inverter sub-system of claim 1 wherein said direct current to direct current galvanically isolated buck converter is structured to reduce a high direct current voltage from the high voltage direct current cable to a medium direct current voltage.

5. A circuit interrupter for a power circuit of a high voltage direct current distribution system, said circuit interrupter comprising:
    a first terminal;
    a second terminal;
    an electromechanical isolation switch;
    a solid-state switch electrically connected in series with said electromechanical isolation switch between said first and second terminals; and
    a controller cooperating with said solid-state switch and said electromechanical isolation switch to open, close and trip open said power circuit, said controller being structured to repetitively turn on and turn off said solid-state switch a plurality of times when said electromechanical isolation switch is closed, in order to control charging of said power circuit from zero volts to a high direct current voltage, wherein said controller further comprises a trip mechanism structured to detect a fault downstream of said second terminal responsive to a failure to charge said power circuit, wherein said trip mechanism is structured to apply a predetermined current pulse to said power circuit, detect a corresponding predetermined voltage increase of a voltage of said power circuit, determine whether, within a certain time period, the voltage of said power circuit has decayed, responsive to determining that the voltage of said power circuit has decayed, determining that the fault downstream of said second terminal is present, and responsive to determining that the voltage of said power circuit has not decayed, determining that the fault downstream of said second terminal is not present.

6. The circuit interrupter of claim 5 wherein when both of said electromechanical isolation switch and said solid-state switch are closed, said second terminal charges said power circuit to or toward the high direct current voltage from said first terminal.

7. The circuit interrupter of claim 6 wherein said controller comprises a modulation element controlling said charging of said power circuit, said modulation element being structured to ramp a duty cycle of said solid-state switch being on from zero to one hundred percent.

8. The circuit interrupter of claim 5 wherein said failure to charge is caused by a short circuit or an insulation failure of a high voltage direct current cable of said power circuit.

* * * * *